United States Patent
Song

(10) Patent No.: US 10,015,313 B2
(45) Date of Patent: Jul. 3, 2018

(54) ELECTRONIC DEVICE FOR PERFORMING CALL RESERVATION AND METHOD THEREOF

(71) Applicant: Moon Bae Song, Seoul (KR)

(72) Inventor: Moon Bae Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 168 days.

(21) Appl. No.: 15/013,527

(22) Filed: Feb. 2, 2016

(65) Prior Publication Data

US 2016/0227033 A1 Aug. 4, 2016

(30) Foreign Application Priority Data

Feb. 2, 2015 (KR) .................. 10-2015-0016343

(51) Int. Cl.
- *H04M 3/487* (2006.01)
- *H04M 1/725* (2006.01)
- *H04M 3/432* (2006.01)
- *H04W 4/16* (2009.01)

(52) U.S. Cl.
CPC ....... *H04M 3/487* (2013.01); *H04M 1/72519* (2013.01); *H04M 1/72566* (2013.01); *H04M 3/432* (2013.01); *H04W 4/16* (2013.01)

(58) Field of Classification Search
CPC ....... H04W 4/16; H04M 3/487; H04M 3/432; H04M 1/72582
See application file for complete search history.

(56) References Cited

U.S. PATENT DOCUMENTS

| 5,872,841 A * | 2/1999 | King .................. H04M 3/432 379/205.01 |
| 8,620,290 B2 | 12/2013 | Sanjeev |
| 9,078,110 B2 | 7/2015 | Yoon |

(Continued)

FOREIGN PATENT DOCUMENTS

| JP | 2007-306515 | 11/2007 |
| JP | 2013-197901 | 9/2013 |

(Continued)

OTHER PUBLICATIONS

International Search Report dated May 20, 2016 issued in counterpart application No. PCT/KR2016/001109, 12 pages.

(Continued)

*Primary Examiner* — Myron K Wyche
(74) *Attorney, Agent, or Firm* — The Farrell Law Firm, P.C.

(57) ABSTRACT

An electronic device and a method thereof area provided. The electronic device includes a communication circuit configured to communicate with at least one or more external electronic devices as a call reservation target, a processor electrically connected with the communication circuit, and a memory electrically connected with the processor. The processor determines a type of a call reservation request from information inputted through a user input requesting a call reservation and controls the communication circuit to perform at least one of transmitting schedule information of the electronic device to the at least one external electronic device and transmitting a request for schedule information of the at least one external electronic device, based on the type of the call reservation request.

15 Claims, 12 Drawing Sheets

(56) References Cited

U.S. PATENT DOCUMENTS

| | | | |
|---|---|---|---|
| 2003/0206619 A1 | 11/2003 | Curbow et al. | |
| 2007/0274494 A1 | 11/2007 | Awamoto et al. | |
| 2010/0246785 A1* | 9/2010 | Wang .............. | H04M 1/72583 |
| | | | 379/88.23 |
| 2011/0207438 A1 | 8/2011 | Sanjeev | |
| 2013/0237258 A1 | 9/2013 | Yoon | |
| 2014/0047001 A1 | 2/2014 | Phillips et al. | |

FOREIGN PATENT DOCUMENTS

| | | |
|---|---|---|
| KR | 1020070121436 | 12/2007 |
| KR | 10-1022380 | 3/2011 |
| KR | 1020130104006 | 9/2013 |
| WO | WO 02/05535 | 1/2002 |

OTHER PUBLICATIONS

European Search Report dated Jul. 1, 2016 issued in counterpart application No. 16153772.5-1972, 8 pages.
Australian Examination Report dated Apr. 3, 2018 issued in counterpart application No. 2016216240, 4 pages.

\* cited by examiner

ELECTRONIC DEVICE FOR PERFORMING CALL RESERVATION AND METHOD THEREOF

PRIORITY

This application claims priority under 35 U.S.C. § 119(a) to a Korean Patent Application filed in the Korean Intellectual Property Office on Feb. 2, 2015 and assigned Serial number 10-2015-0016343, the entire disclosure of which is incorporated herein by reference.

BACKGROUND

1. Field of the Disclosure

The present disclosure relates generally to an electronic device performing call reservation and a method thereof, and more particularly, to an electronic device and method for performing call reservation in a manner determined according to a type of a call reservation request.

2. Description of the Related Art

Due to recent developments in information and communication technologies, network devices, such as base stations, have been installed throughout the country. Portable electronic devices, such as mobile terminals, for example, receive and transmit data from and to another electronic device through networks provided by network devices, such as base stations, and therefore, users of such electronic devices are able to utilize these networks throughout the country.

In accordance with the recent trend of digital convergence, various kinds of electronic devices have been developed to provide a variety of functions. For example, a smart phone supports an Internet connection function as well as a call function. A smart phone may also support functions including, for example, playback of music or video, capturing of video, photo, and the like using an image sensor, and other such functions.

In order for a user of an electronic device such as a smart phone to call another person, the user may set an alarm for a time when the user wants to make a call, and may later make the call, in response to the alarm ringing at the set time.

SUMMARY

The present disclosure has been made to address at least the above-mentioned problems and/or disadvantages and to provide at least the advantages described below. Accordingly, an aspect of the present disclosure is to provide an electronic device which performs call reservation for making a call to an external electronic device and a method thereof.

In accordance with an aspect of the present disclosure, an electronic device is provided. The electronic device includes a communication circuit configured to communicate with at least one or more external electronic devices as a call reservation target, a processor electrically connected with the communication circuit, and a memory electrically connected with the processor. The processor determines a type of a call reservation request from information inputted through a user input requesting a call reservation and controls the communication circuit to perform at least one of transmitting schedule information of the electronic device to the at least one external electronic device and transmitting a request for schedule information of the at least one external electronic device, based on the type of the call reservation request.

In accordance with another aspect of the present disclosure, a method is provided. The method includes receiving a user input requesting a call reservation with respect to at least one external electronic device, determining a type of a call reservation request from information inputted through the user input, and transmitting, to the at least one external electronic device, at least one of schedule information of the electronic device and a request for schedule information of the external electronic device, based on the type of the call reservation request.

In accordance with another aspect of the present disclosure, a computer-readable recording medium having an instruction recorded thereon is provided. The instruction, which is executed by at least one processor, causes the processor to perform a method, which includes receiving a user input requesting a call reservation with respect to at least one external electronic device, determining a type of a call reservation request from information inputted through the user input, and transmitting, to the at least one external electronic device, at least one of schedule information of the electronic device and a request for schedule information of the external electronic device, based on the type of the call reservation request.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 4A is a diagram illustrating a call reservation UI displayed on a screen of an electronic device and a call reservation automatic scheduling method, according to an embodiment of the present disclosure;

FIG. 4B is a diagram illustrating a call reservation UI displayed on a screen of an electronic device and a call reservation automatic scheduling method, according to an embodiment of the present disclosure;

FIG. 4C is a diagram illustrating a call reservation UI displayed on a screen of an electronic device and a call reservation automatic scheduling method, according to an embodiment of the present disclosure;

DETAILED DESCRIPTION

Figure 1:
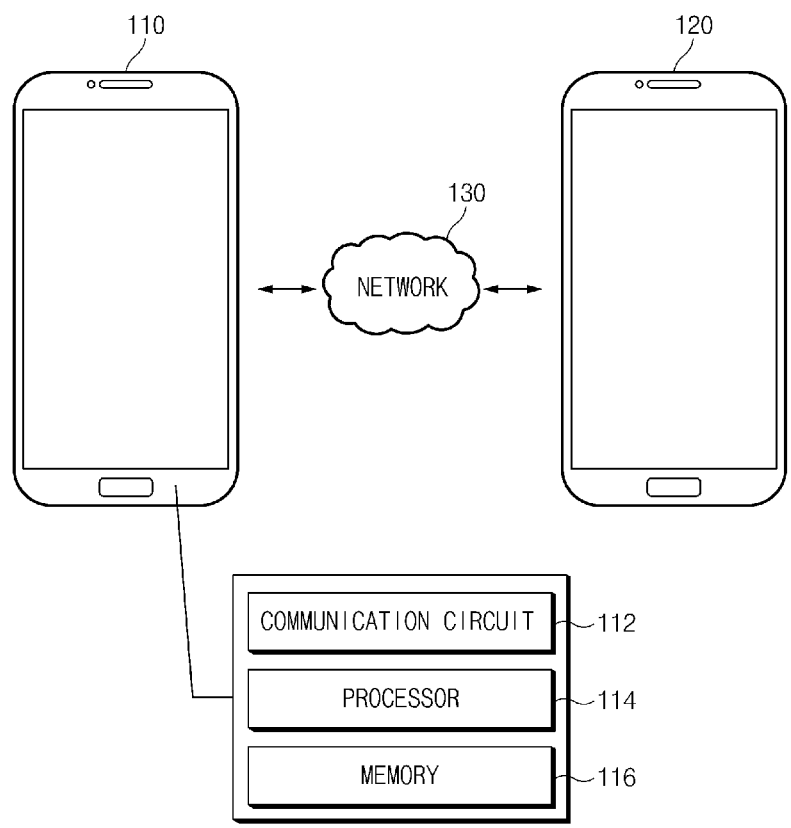
FIG. 1 is a block diagram illustrating a system performing call reservation, according to an embodiment of the present disclosure.

Various embodiments of the present disclosure are described as follows with reference to accompanying drawings. Accordingly, those of ordinary skill in the art will recognize that modification, equivalent, and/or alternatives to the various embodiments described herein can be variously made without departing from the scope and spirit of the present disclosure. With regard to description of drawings, similar components may be designated by similar reference numerals.

Notably, the terms used to describe specific embodiments of the present disclosure are not intended to limit the scope of other embodiments. The terms of a singular form may include plural forms unless they have a clearly different meaning in the context.

Additionally, unless otherwise indicated herein, all the terms, which include technical or scientific terms, may have the same meanings that are generally understood by a person skilled in the art. In general, terms defined in a dictionary should be considered to have the same meanings as is customary in the related art, and should not be understood abnormally or as having an excessively formal meaning.

Regardless, even the terms defined in this specification cannot be interpreted as excluding embodiments of the present disclosure.

The expressions "have", "may have", "include", "comprise", "may include" and "may comprise", as used herein, indicate existence of corresponding features (e.g., elements such as numeric values, functions, operations, or components) but do not exclude presence of additional features.

For example, the expressions "A or B", "at least one of A or/and B", "one or more of A or/and B", and the like, as used herein, may include any and all combinations of one or more of the associated listed items. For example, the terms "A or B", "at least one of A and B", or "at least one of A or B" may indicate at least one A, at least one B, or at least one A and at least one B.

The terms, such as "first", "second", etc., as used herein, may modify to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

When an element (e.g., a first element) is referred to as being "(operatively or communicatively) coupled with/to" or "connected to" another element (e.g., a second element), the element can be directly coupled with/to or connected to the other element, or an intervening element (e.g., a third element) may be present. By contrast, when an element (e.g., a first element) is referred to as being "directly coupled with/to" or "directly connected to" another element (e.g., a second element), there are no intervening element (e.g., a third element).

The expression "configured to" used herein may be interchangeably used with, for example, the expressions "suitable for", "having the capacity to", "designed to", "adapted to", "made to", or "capable of". The term "configured to" does not necessarily mean "specifically designed to" with respect to hardware. Instead, the expression "a device configured to" may mean that the device is "capable of" operating together with another device or other components. CPU, for example, a "processor configured to perform A, B, and C" may mean a dedicated processor (e.g., an embedded processor) for performing a corresponding operation or a generic-purpose processor (e.g., a central processing unit (CPU) or an application processor) that may perform corresponding operations by executing one or more software programs that are stored in a memory device.

An electronic device according to various embodiments of the present disclosure may include, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to an embodiment of the present disclosure, an electronic device may be a smart home appliance. The smart home appliances may include at least one of, for example, televisions (TVs), digital versatile disc (DVD) players, audios, refrigerators, air conditioners, cleaners, ovens, microwave ovens, washing machines, air cleaners, set-top boxes, TV boxes, game consoles, electronic dictionaries, electronic keys, camcorders, electronic picture frames, and the like.

According to an embodiment of the present disclosure, the electronic devices may include medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs), flight data recorders (FDRs), vehicle infotainment devices, electronic equipment for vessels (e.g., navigation systems and gyrocompasses), avionics, security devices, head units for vehicles, industrial or home robots, automatic teller machines (ATMs), points of sales (POSs) devices, or devices connected to the Internet of Things (IoT) (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include furniture or buildings/structures, electronic boards, electronic signature receiving devices, projectors, or various measuring instruments (e.g., water meters, electricity meters, gas meters, or wave meters, and the like). Electronic devices according to embodiments of the present disclosure may be one or more combinations of the above-mentioned devices. According to embodiments of the present disclosure, an electronic device may be a flexible electronic device. Electronic devices according to various embodiments of the present disclosure are not limited to the above-mentioned devices, and may include new electronic devices according to developments in technology.

The term "user", as used herein, may refer to a person who uses an electronic device or may refer to a device (e.g., an artificial intelligence electronic device) that uses an electronic device.

Furthermore, in accompanying drawings, an electronic device and an external electronic device according to various embodiments of the present disclosure will be described as being a smartphone.

FIG. 1 is a block diagram illustrating a system performing call reservation, according to an embodiment of the present disclosure.

Referring to. FIG. 1, a system performing the call reservation includes an electronic device 110, an external electronic device 120, and a network 130.

The electronic device 110 includes a communication circuit 112, a processor 114, and a memory 116. However, a configuration of the electronic device 110 illustrated in FIG. 1 is merely provided as an example and may be changed or modified in accordance with embodiments of the present disclosure. For example, the electronic device 110 may further include a user interface for receiving any instruction or information from a user. The user interface may include an input device such as a keyboard, a mouse, or the like. Additionally or alternatively, the user interface may also include a graphic user interface (GUI) displayed on a screen of the electronic device 110.

The communication circuit 112 may perform communication using at least one communication protocol, corresponding to the network 130, from among a plurality of communication protocols. For example, the communication circuit 112 may perform near field communication (NFC), Bluetooth (BT) communication, or Bluetooth low energy (BLE) communication and may transmit and receive data to and from the external electronic device 120. Data that is exchanged between the communication circuit 112 and the external electronic device 120 may be schedule information of the electronic device 110, schedule information of the external electronic device 120, or feedback information about the call reservation.

The processor 114 may be implemented with, for example, a system on chip (SoC) and may include one or more of a central processing unit (CPU), a graphic processing unit (GPU), an image signal processor, an application processor (AP), and a communication processor (CP). The processor 114 may load and process an instruction or data, which is received from at least one of other components, and may store a variety of data at the memory 116.

The processor 114 may determine a type (e.g., an automatic scheduling type or a manual scheduling type) of a call reservation request from information inputted through a user input requesting the call reservation. A user input requesting the call reservation may be received through a call reservation user interface (UI) displayed on a screen of the electronic device 110. The call reservation UI is described in detail later herein with reference to FIG. 3. Types of the call reservation request may include automatic scheduling and manual scheduling.

At least partially based on the determined type of the call reservation request, the processor 114 may control the communication circuit 112 to transmit schedule information of the electronic device 110 to the external electronic device 120 or may control the communication circuit 112 to request schedule information of the external electronic device 120.

When the determined type of the call reservation request is automatic scheduling, the processor 114 may control the communication circuit 112 to transmit schedule information of the electronic device 110 to the external electronic device 120. The external electronic device 120 may determine a call reservation scheduled event using the schedule information received from the electronic device 110. The processor 114 may control the communication circuit 112 to receive the determined call reservation scheduled event from the external electronic device 120. When the determined call reservation scheduled event is received from the external electronic device 120, the electronic device 110 may interpret the call reservation scheduled event as an automatically scheduled call reservation.

When the determined type of the call reservation request is the manual scheduling type, the processor 114 may refrain from controlling the communication circuit 112 to transmit schedule information of the electronic device 110 to the external electronic device 120 or may refrain from controlling the communication circuit 112 to request schedule information of the external electronic device 120. When the determined type of the call reservation request is the manual scheduling type, the processor 114 may control the communication circuit 112 to transmit a call reservation request, including a call reservation scheduled event inputted through the user input, to the external electronic device 120.

The external electronic device 120 may provide feedback in response to the transmitted call reservation request based on user input. The call reservation scheduled event may be confirmed when the external electronic device 120 receives the user input accepting the call reservation request from a user of the external electronic device 120.

When the user of the external electronic device 120 declines the call reservation request, the external electronic device 120 may transmit information indicating the rejection (i.e., rejection) to the electronic device 110, and the processor 114 may allow the communication circuit 112 to transmit a call reservation request, including a changed call reservation scheduled event, to the external electronic device 120. The changed call reservation scheduled event may be set through user input received from a user of the electronic device 110.

When the user of the external electronic device 120 wants to change the call reservation scheduled event to a different time, the external electronic device 120 may request a change about the call reservation scheduled event from the electronic device 110, and the user of the electronic device 110 may provide a feedback about the changed reservation schedule. The feedback of the user of the electronic device 110 may be any of, for example, accept, decline, schedule change request, or the like. Furthermore, the feedback may be input and/or viewed through a feedback UI displayed on the screen of the electronic device 110.

When the user of the external electronic device 120 accepts the call reservation request or requests a change about the call reservation scheduled event, the external electronic device 120 may register the confirmed scheduled event or a state in which a schedule change is requested, at a schedule application or another corresponding application or storage location.

When the call reservation scheduled event is confirmed, the processor 114 may register the confirmed schedule at the memory 116. Furthermore, the processor 114 may register the confirmed schedule at the schedule application or other corresponding application or interface. When the call reservation scheduled event is confirmed, the processor 114 may reject a call that comes from an electronic device other than the external electronic device 120, at a time corresponding to the confirmed schedule. Similarly, the external electronic device 120 may reject a call that comes from an electronic device other than the electronic device 110, at a time corresponding to the confirmed schedule.

According to an embodiment of the present disclosure, an operation in which the processor 114 controls the communication circuit 112 to transmit schedule information of the electronic device 110 to the external electronic device 120 or to request schedule information of the external electronic device 120 may be performed further based on the number of one or more external electronic devices. An example in which external electronic device 120 corresponds to a plurality of electronic devices is described later herein with reference to FIG. 8.

The memory 116 may store data, for example, instructions about operations performed by the processor 114. Data stored in the memory 116 may include, for example, data exchanged between internal components of the electronic device 110 and data exchanged between the electronic device 110 and external components thereof. For example, the memory 116 may store a call reservation UI, a feedback UI, and the like.

The memory 116 may include an embedded (or internal) memory or an external memory. For example, the embedded memory may include at least one of a volatile memory (e.g., a dynamic random access memory (DRAM), a static RAM (SRAM), or a synchronous DRAM (SDRAM)), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a NAND flash memory, or a NOR flash memory), a hard disk drive (HDD), or a solid state drive (SSD).

The external memory may include a flash drive, for example, compact flash (CF), secure digital (SD), micro secure digital (Micro-SD), mini secure digital (Mini-SD), extreme digital (xD), multimedia card (MMC), or memory stick. The external memory may be functionally and/or physically connected to the electronic device 110 through various interfaces.

The communication circuit 112, the processor 114, and the memory 116 may implemented independently of each other, or two or more thereof may be integrated with each other in accordance with embodiments of the present disclosure.

Also, the electronic device 110 and the external electronic device 120 may be connected through a network 130. The network 130 may refer to a connection structure that allows nodes such as terminals and servers to exchange information and may include wireless communication and wired communication. The wireless communication may include at least one of, for example, long-term evolution (LTE), LTE-advanced (LTE-A), code division multiple access (CDMA), wideband CDMA (WCDMA), universal mobile telecommunications system (UMTS), wireless broadband (WiBro), global system for mobile communications (GSM), etc., as cellular communication protocol. Furthermore, the wireless communication may include, for example, a local area network. The local area network may include at least one of a Wi-Fi network, an NFC network, a global positioning system (GPS) network, etc. The wired communication may include communication conforming to at least one of, for example, a universal serial bus (USB), a high definition multimedia interface (HDMI), a recommended standard-132 (RS-132), or a plain old telephone service (POTS). The network 130 may include at least one of telecommunications networks such as, for example, a computer network (e.g., a local area network (LAN) or a wide area network (WAN)), Internet, or a telephone network.

According to an embodiment of the present disclosure, the call reservation types may further include a place-based scheduling type. When the call reservation type includes place-based scheduling, the processor 114 may transmit information about a place, which is designated by a user, to the external electronic device 120 through the communication circuit 112. The designated place may correspond to the electronic device 110 and may correspond to the external electronic device 120. For example, when the electronic device 110 or the external electronic device 120 arrives at the designated place, a call between the electronic device 110 and the external electronic device 120 may occur.

Figure 2:
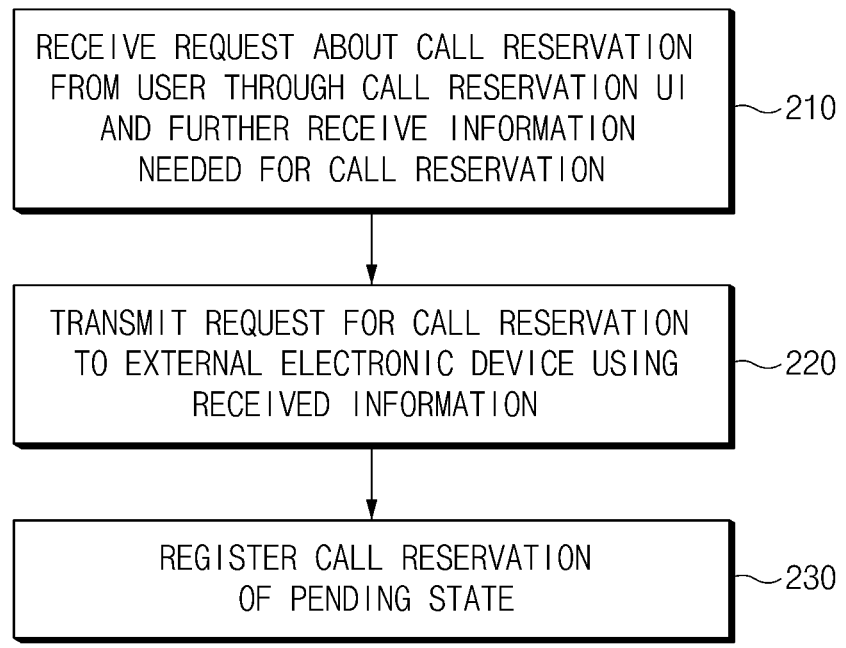
FIG. 2 is a flow chart illustrating a method in which an electronic device generates and registers call reservation, according to an embodiment of the present disclosure.

FIG. 2 is a flow chart illustrating a method in which an electronic device generates and registers call reservation, according to an embodiment of the present disclosure.

In step 210, the electronic device 110 receives a request related to a call reservation from a user through the call reservation UI, and may further receive information needed for the call reservation.

In step 220, the electronic device 110 may transmit a request for the call reservation to the external electronic device 120 using the information received in step 210. The electronic device 110 may transmit at least a part of the information received in step 210 to the external electronic device 120. The transmitted information may include, for example, a call reservation scheduled event, an expected talk time, an agenda, etc.

In step 230, the electronic device 110 registers the call reservation in a pending state (i.e., the reservation is pending). For example, the electronic device 110 may register the call reservation, in a pending state, at the schedule application or other corresponding application or storage location. When a notification of acceptance is sent from the external electronic device 120, the pending state of the call reservation may be changed to a confirmation state.

Operations according to the method of FIG. 2 may be performed when the call reservation type is the manual scheduling type. According to an embodiment of the present disclosure, when the call reservation type is the automatic scheduling type, in step 220, the electronic device 110 requests schedule information of the external electronic device 120. The electronic device 110 may also register the call reservation in a pending state at the schedule application or another corresponding application or storage until a call reservation scheduled event is confirmed.

Figure 3:
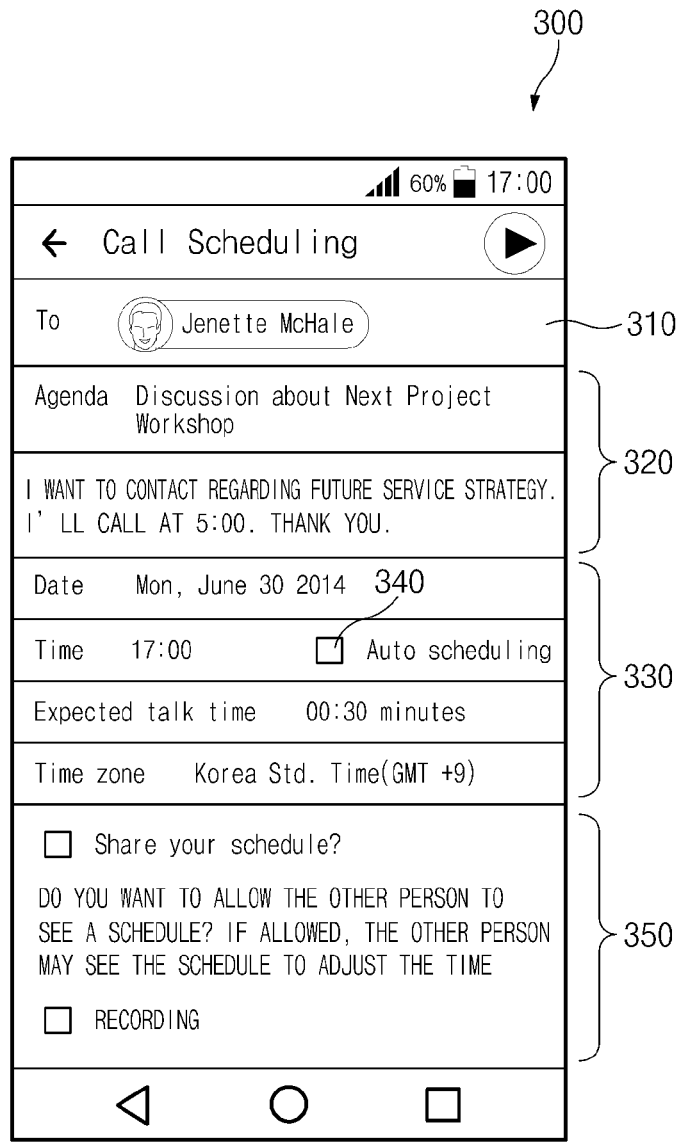
FIG. 3 is a diagram illustrating a call reservation UI displayed on a screen of an electronic device 110, according to an embodiment of the present disclosure.

FIG. 3 is a diagram illustrating a call reservation UI displayed on a screen of an electronic device 110, according to an embodiment of the present disclosure.

Referring to. FIG. 3, a call reservation UI 300 includes, for example, areas associated with a user 310 of the external electronic device 120 as a person for whom a call is reserved, an agenda 320, a call reservation scheduled event 330, a call reservation type determination button 340, an additional option, etc.

Information on the user 310 of the external electronic device 120 may be stored in the memory 116 of the electronic device 110. When the information on the user 310 of the external electronic device 120 is not stored in the memory 116 of the electronic device 110, the information on the user 310 of the external electronic device 120 may be displayed with a phone number instead of a registered name of the user 310.

A call reservation date, a call reservation time, an expected talk time, a time difference between the electronic device 110 and the external electronic device 120 are written in the call reservation scheduled event 330.

The electronic device 110 may determine whether a type of the call reservation is an automatic scheduling type or the manual scheduling type based on whether the call reservation type determination button 340 is checked.

The additional option 350 may include a button for determining whether to share schedule information of the electronic device 110 with the external electronic device 120, and a button for determining whether to record a call.

Figures 4A, 4B, 4C:
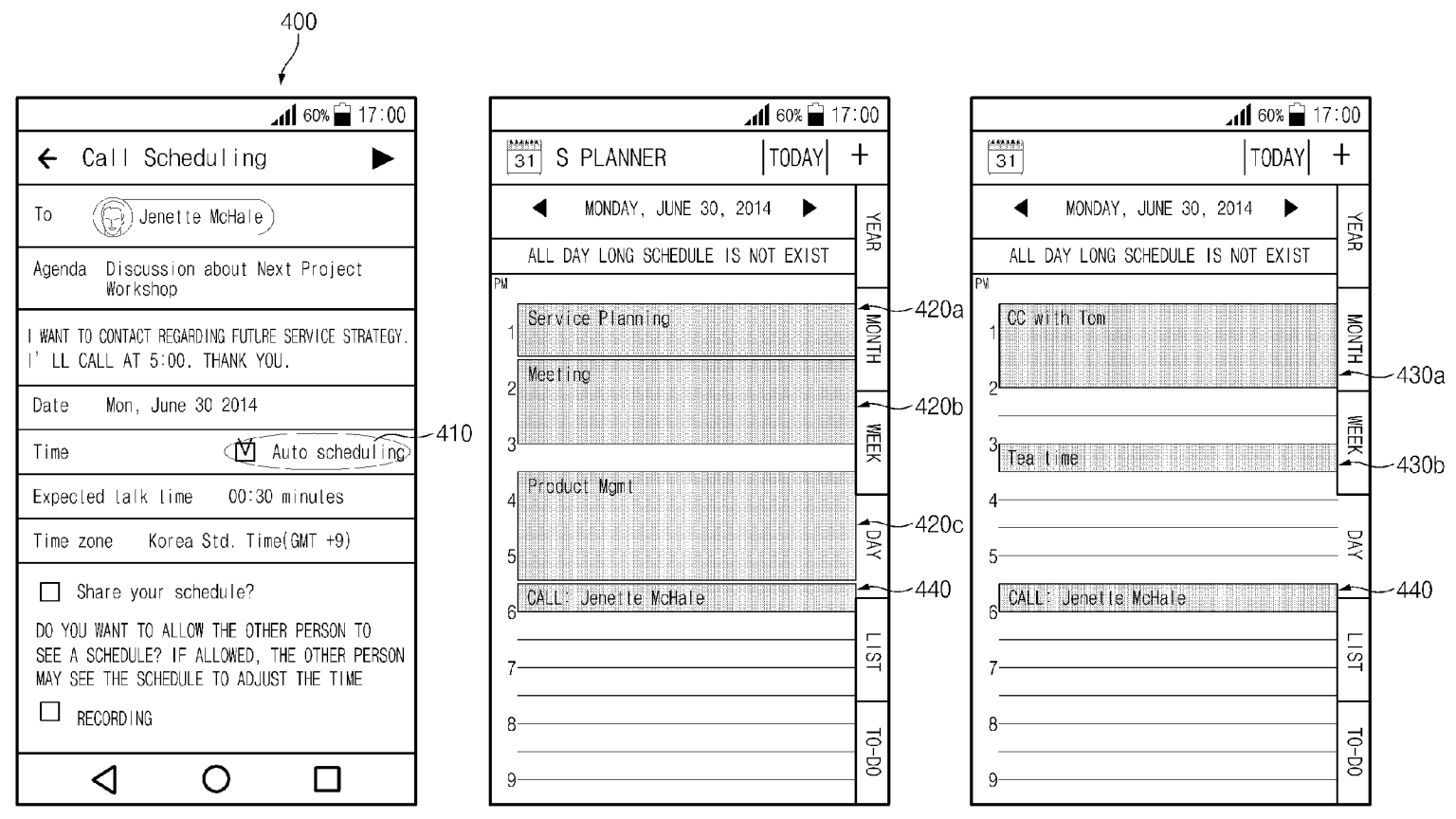

FIGS. 4A to 4C are diagrams illustrating a call reservation UI displayed on a screen of an electronic device 110 and a call reservation automatic scheduling method, according to an embodiment of the present disclosure.

The call reservation UI 400 illustrated in FIG. 4A corresponds to the call reservation UI 300 of FIG. 3. Therefore, a separate description of the call reservation UI 400 is omitted. Referring to the call reservation UI 400, since a call reservation type determination button 410 (corresponding to the call reservation type determination button 340 of FIG. 3) is checked, the electronic device 110 may request call reservation of an automatic scheduling type from the external electronic device 120.

As described above, when the type of the call reservation is automatic scheduling, the electronic device 110 may send a request for schedule information of the external electronic device 120 to the external electronic device 120. FIG. 4B shows schedule information of the electronic device 110, and FIG. 4C shows schedule information of the external electronic device 120. FIGS. 4B and 4C illustrate schedule application screens of the electronic device 110 and the external electronic device 120, respectively.

Referring to FIG. 4B, scheduled events 420a, 420b, and 420c of a user of the electronic device 110 are stored for times ranging from 12:30 pm to 3:00 pm and from 3:30 pm to 5:30 pm. Referring to FIG. 4B, scheduled events 430a and 430b of a user of the external electronic device 120 are stored for time ranging from 12:30 pm to 2:00 pm and from 3:00 pm to 3:30 pm.

The electronic device 110 may compare schedule information of the electronic device 110 and schedule information of the external electronic device 120 in order to determine a call reservation scheduled event. Referring to FIG. 4A, since an expected talk time is set with 30 minutes, the electronic device 110 may compare the schedule information of the electronic device 110 and the schedule information of the external electronic device 120 and may determine a time when it is possible to allocate 30 minutes. Referring to a reference numeral 440 of each of FIGS. 4B and 4C, the electronic device 110 determines a time from 5:30 pm to 6:00 pm as time period reserved for a call reservation scheduled event.

Figure 5:
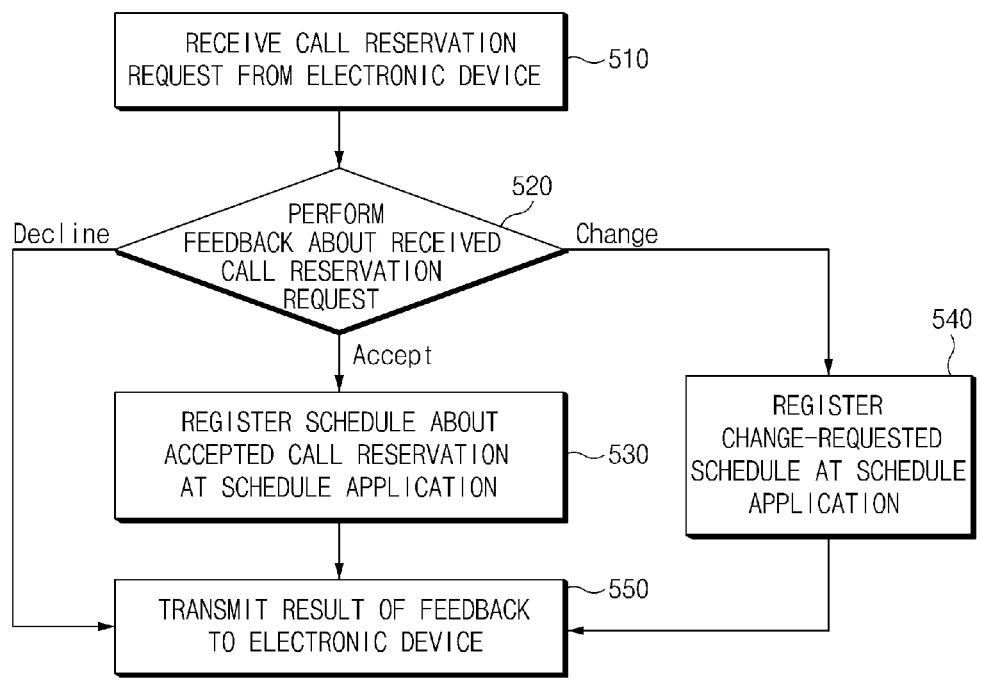
FIG. 5 is a flow chart illustrating a method in which an external electronic device perform a feedback about call reservation, according to an embodiment of the present disclosure.

FIG. 5 is a flow chart illustrating a method in which an external electronic device performs a feedback about a call reservation, according to an embodiment of the present disclosure.

In step 510, the external electronic device 120 receives a call reservation request from the electronic device 110. The call reservation request may include a reservation schedule that is inputted to the electronic device 110.

In step 520, the external electronic device 120 performs feedback regarding the call reservation request received in step 510. The feedback may be generated through a feedback UI (described in further detail herein with reference to FIG. 6) that is displayed on the screen of the external electronic device 120. The feedback may include, for example, acceptance, rejection, a schedule change request, etc., regarding the call reservation request.

If the feedback is acceptance of the call reservation request, the method proceeds to step 530. If the feedback is a request to change the scheduled event corresponding to the call reservation request, the method proceeds to step 540. If the feedback is a rejection of the call reservation request, the method proceeds to step 550.

In step 530, the external electronic device 120 registers a scheduled event regarding the accepted call reservation at a schedule application or other corresponding application or storage location.

In step 540, the external electronic device 120 registers the schedule, for which a change is requested, at the schedule application or other corresponding application or storage location. The schedule, for which a change is requested, which is in a pending state, may be registered at the schedule application.

In step 550, the external electronic device 120 transmits a result of the feedback performed in step 520 to the electronic device 110.

Figure 6:
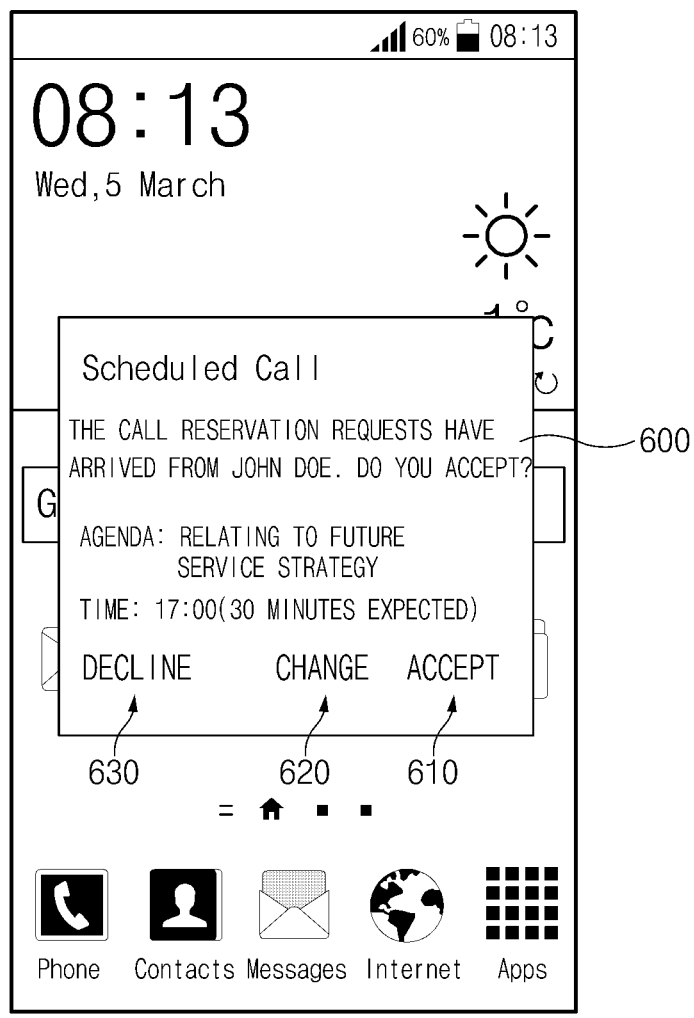
FIG. 6 is a diagram illustrating a feedback UI regarding a call reservation displayed on a screen of an external electronic device, according to an embodiment of the present disclosure.

FIG. 6 is a diagram illustrating a feedback UI regarding a call reservation displayed on a screen of an external electronic device 120, according to an embodiment of the present disclosure.

When the external electronic device 120 receives a request regarding a call reservation from the electronic device 110, the external electronic device 120 displays a feedback UI 600 regarding the call reservation request on a screen thereof. A user of the electronic device 110, an agenda, a call reservation scheduled event, an expected talk time, etc. included in the call reservation request are displayed on the feedback UI 600. Furthermore, an accept button 610, a schedule change request button 620, and a decline button 630 regarding the call reservation request are displayed on the feedback UI 600. The external electronic device 120 may determine feedback based on a user input performed with respect to one of the accept button, the schedule change request button, and the decline button.

Figure 7:
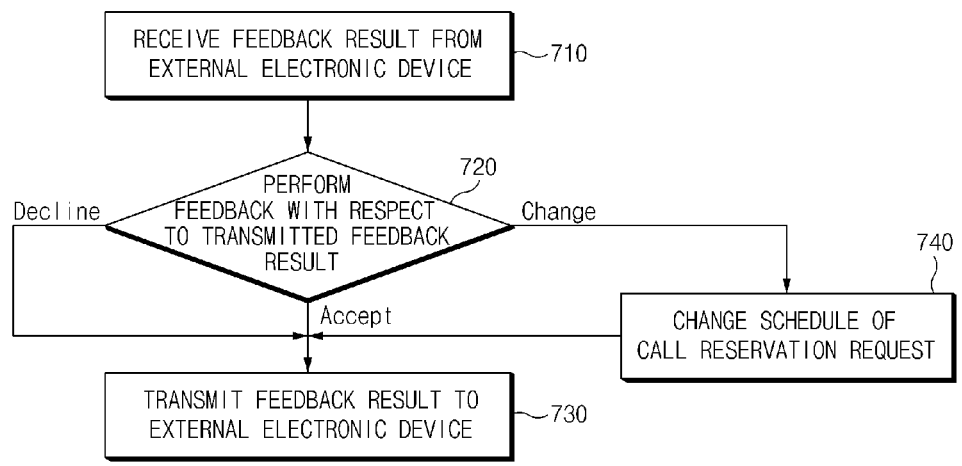
FIG. 7 is a flow chart illustrating a method in which an electronic device performs feedback based on a feedback result of an external electronic device, according to an embodiment of the present disclosure.

FIG. 7 is a flow chart illustrating a method in which an electronic device performs feedback based on a feedback result of an external electronic device, according to an embodiment of the present disclosure.

In step 710, the electronic device 110 receives a feedback result from the external electronic device 120. The feedback result may correspond to a user input that the external electronic device 120 has received with respect to one of the accept button 610, the schedule change request button 620, and the decline button 630 illustrated in FIG. 6.

In step 720, the electronic device 110 performs feedback with respect to the feedback result received in step 710. A feedback operation performed by the electronic device 110 may be similar to a feedback operation performed via the feedback UI 600 of the external electronic device 200, as shown and described with reference to FIG. 6. When the feedback result of the electronic device 110 is acceptance or rejection, the method proceeds to step 730. However, when the feedback result of the electronic device 110 is a schedule change request, the method proceeds to step 740.

For example, when the feedback result of the external electronic device 120 received in step 710 is a schedule change request, the electronic device 110 may accept or reject the requested changed scheduled event or may suggest a different scheduled event (or may request a scheduled event change). When the feedback of the external electronic device 120 transmitted in step 710 is acceptance, the electronic device 110 accepts the feedback. When the feedback of the external electronic device 120 received in step 710 is a rejection, the electronic device 110 may suggest a different schedule (or request a scheduled event change).

In step 730, the electronic device 110 transmits a feedback result indicating acceptance or rejection, which is input in step 720, to the external electronic device 120. Furthermore, the electronic device 110 may register the feedback result of acceptance or rejection performed in step 720 at a schedule application or the like. When the electronic device 110 provides acceptance feedback in response to the acceptance of the external electronic device 120, the electronic device 110 may confirm a call reservation scheduled event, in a pending state, registered at the schedule application. When the feedback of the electronic device 110 indicates acceptance regarding the scheduled event change request of the external electronic device 120, the electronic device 110 may register a changed call reservation scheduled event at the schedule application or the like. When the electronic device 110 performs feedback of rejection with respect to a feedback of acceptance or a scheduled event change of the external electronic device 120 or when the electronic device 110 performs feedback indicating acceptance with respect to feedback indicating rejection received from the external electronic device 120, the electronic device 110 may delete a corresponding call reservation scheduled event, which is in a pending state, registered at the schedule application or another corresponding application or storage location.

In step 740, the electronic device 110 may change a scheduled event of the call reservation request. Furthermore, the electronic device 110 may register the call reservation of the changed schedule at the schedule application, or other corresponding application or storage location, with a pending state. In step 730, the electronic device 110 may also transmit a scheduled event change request to the external electronic device 120.

Figure 8:
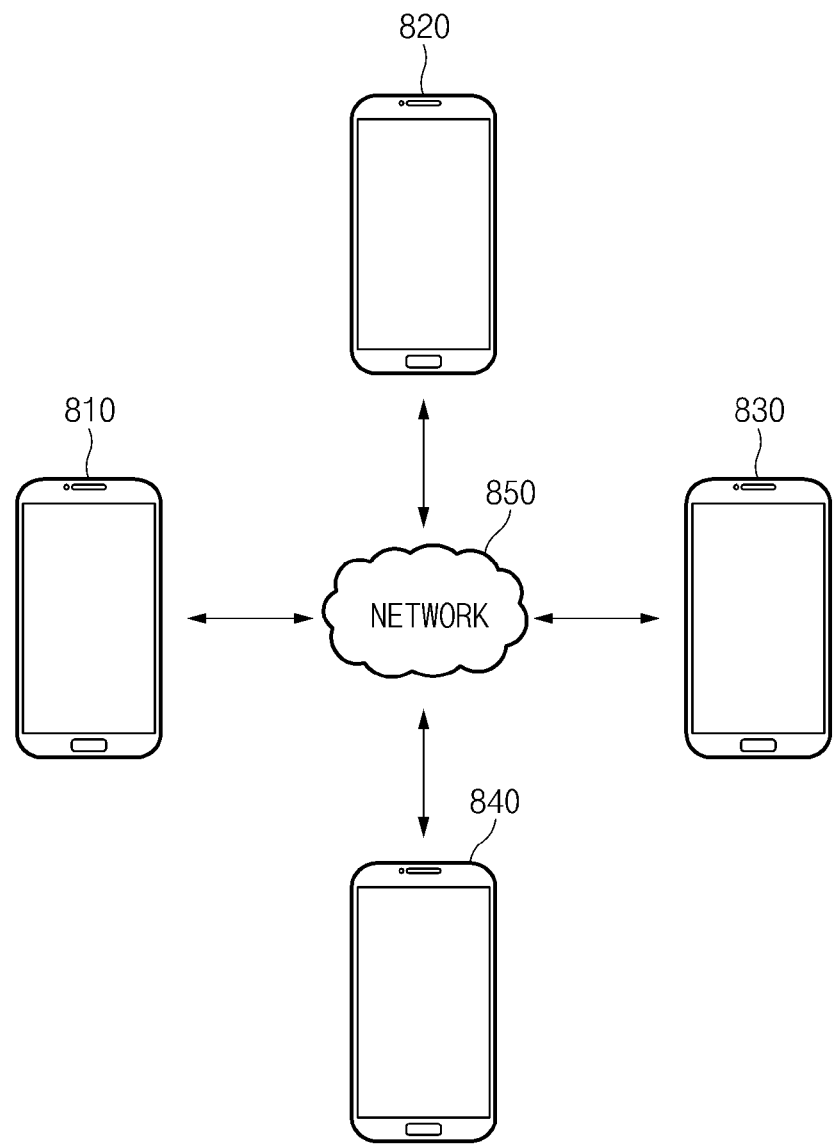
FIG. 8 is a diagram illustrating a system that performs call reservation when there is a plurality of external electronic devices, according to an embodiment of the present disclosure.

FIG. 8 is a diagram illustrating a system that performs call reservation when there is a plurality of external electronic devices, according to an embodiment of the present disclosure. As described above, an operation in which the processor 114 transmits schedule information of the electronic device 110 to the external electronic device 120 through the communication circuit 112 or requests schedule information of the external electronic device 120 may also be performed based on the number of external electronic devices.

The system that performs the call reservation includes, for example, an electronic device 810, a first external electronic device 820, a second electronic device 830, a third electronic device 840, and a network 850. The network 850, which corresponds to the network 130 illustrated in FIG. 1, connects the electronic device 810 with at least one of the first external electronic device 820, the second electronic device 830, and the third electronic device 840.

The electronic device 810, which corresponds to the electronic device 110 of FIG. 1, may include a communication circuit, a processor, and a memory.

The electronic device 810 may determine a type (e.g., an automatic scheduling type or a manual scheduling type) of a call reservation request from information inputted through a user input requesting the call reservation. The user input may designate a plurality of external electronic devices (e.g., the external electronic devices 820 to 840).

The electronic device 810 may send a request for schedule information to each of the external electronic devices 820, 830, and 840, at least partially based on the determined type of the call reservation request.

As described herein above with reference to FIG. 1, when the type of the call reservation request is a manual scheduling type, the electronic device 810 may not transmit schedule information of the electronic device 810 to the external electronic devices 820 to 840 and may not request schedule information of the external electronic devices 820 to 840. Instead, the electronic device 810 may transmit at least a part of information input through a call reservation UI to the external electronic devices 820 to 840 together with a call reservation.

When the type of the call reservation request is the automatic scheduling type as FIG. 1, the electronic device 110 may transmit schedule information of the electronic device 110 to the external electronic device 120. The transmission of the schedule information may be performed in a manner that corresponds to transmission performed according to an embodiment of the present disclosure, in which the type of the call reservation request is the automatic scheduling type for a single external electronic device.

In contrast to the above-described embodiment of the present disclosure, in which there is a plurality of external electronic devices and the type of the call reservation request is the automatic scheduling type, the electronic device 810 may send a request for schedule information to the external electronic devices 820 to 840.

The electronic device 810 may receive schedule information of each of the external electronic devices 820 to 840 and may perform automatic scheduling using the schedule information of the electronic device 810 and the schedule information of each of the external electronic devices 820 to 840. An operation to perform automatic scheduling using schedule information of the plurality of electronic devices may correspond to an automatic scheduling method described with reference to FIG. 4. For example, the electronic device 810 may compare the schedule information of the electronic device 810 and the schedule information of each of the external electronic devices 820 to 840, and may set call reservation in the light of an expected talk time, at a time when schedules of the external electronic devices 820 to 840 and the electronic device 810 do not exist. The set call reservation scheduled event may be transmitted to each of the external electronic devices 820 to 840.

Each of the external electronic devices 820 to 840 may perform a feedback with respect to a call reservation request received from the electronic device 810. The feedback performed by each of the external electronic devices 820 to 840 may correspond to a method in which the external electronic device 120 illustrated in FIG. 5 performs a feedback about call reservation, and a separate description thereof is thus omitted.

The feedback regarding the call reservation performed by each of the external electronic devices 820 to 840 may be transmitted to the electronic device 810. The electronic device 810 may process the received feedback, and based on a processing result, the electronic device 810 may confirm or cancel a call reservation scheduled event or may change a scheduled event. This processing is described in more detail later herein, with reference to FIG. 9.

According to an embodiment of the present disclosure, even when an automatic scheduling type is selected on the electronic device 810, it is possible that a common available time does not exist as a result of comparing schedule information of the electronic device 810 and the external electronic devices 820 to 840. In this case, the electronic device 810 may recommend a user to set a manual scheduling type.

Figure 9:
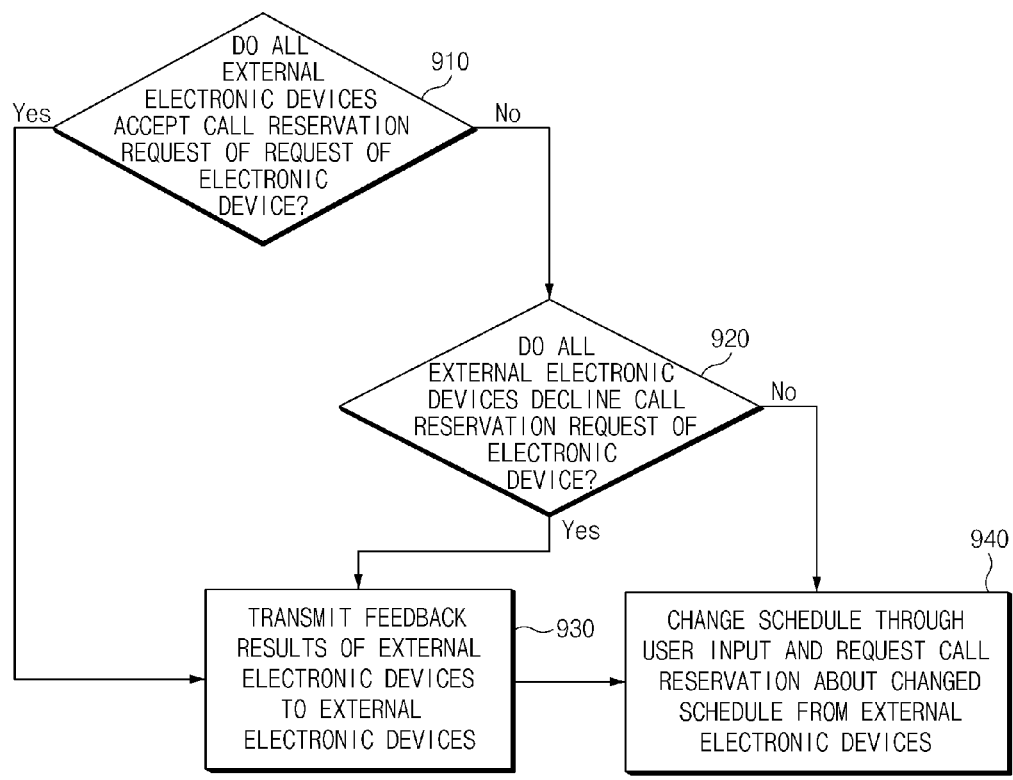
FIG. 9 is a flow chart illustrating a method in which an electronic device processes a feedback about call reservation of each of a plurality of external electronic devices including a first external electronic device, a second external electronic device, and a third external electronic device, according to an embodiment of the present disclosure.

FIG. 9 is a flow chart illustrating a method in which an electronic device processes a feedback about call reservation of each of a plurality of external electronic devices including a first external electronic device, a second external electronic device, and a third external electronic device, according to an embodiment of the present disclosure.

In step 910 and step 920, the electronic device 810 determines a feedback result received from each of the external electronic devices 820 to 840.

In when the determination result indicates that at least one of the external electronic devices 820 to 840 rejects a call reservation request of the electronic device 810, the method proceeds to step 920.

When the determination result of step 920 indicates that all of the external electronic devices 820 to 840 decline the call reservation request of the electronic device 810, the method proceeds to step 930. By contrast, when the determination result of step 920 indicates that only some of the external electronic devices 820 to 840 decline the call reservation request of the electronic device 810, the method proceeds to step 940.

When the determination result of step 910 indicates that all the external electronic devices 820 to 840 accept the call reservation request of the electronic device 810, the method proceeds to step 930.

In step 930, the electronic device 810 transmits feedback results of the external electronic devices 820 to 840 to the external electronic devices 820 to 840. For example, the electronic device 810 may transmit, to the external electronic devices 820 to 840, information indicating whether the call reservation scheduled event is confirmed or declined according to feedback received from each of the external electronic devices 820 to 840.

In step 940, the electronic device 810 may change a scheduled event through a user input and may request call reservation about the changed scheduled event from the external electronic devices 820 to 840.

When all of the external electronic devices 820 to 840 decline the call reservation, in step 930, the electronic device 810 transmits, to each of the external electronic devices 820 to 840, feedback results of the external electronic devices 820 to 840, and the method may proceed to step 940.

Figure 10:
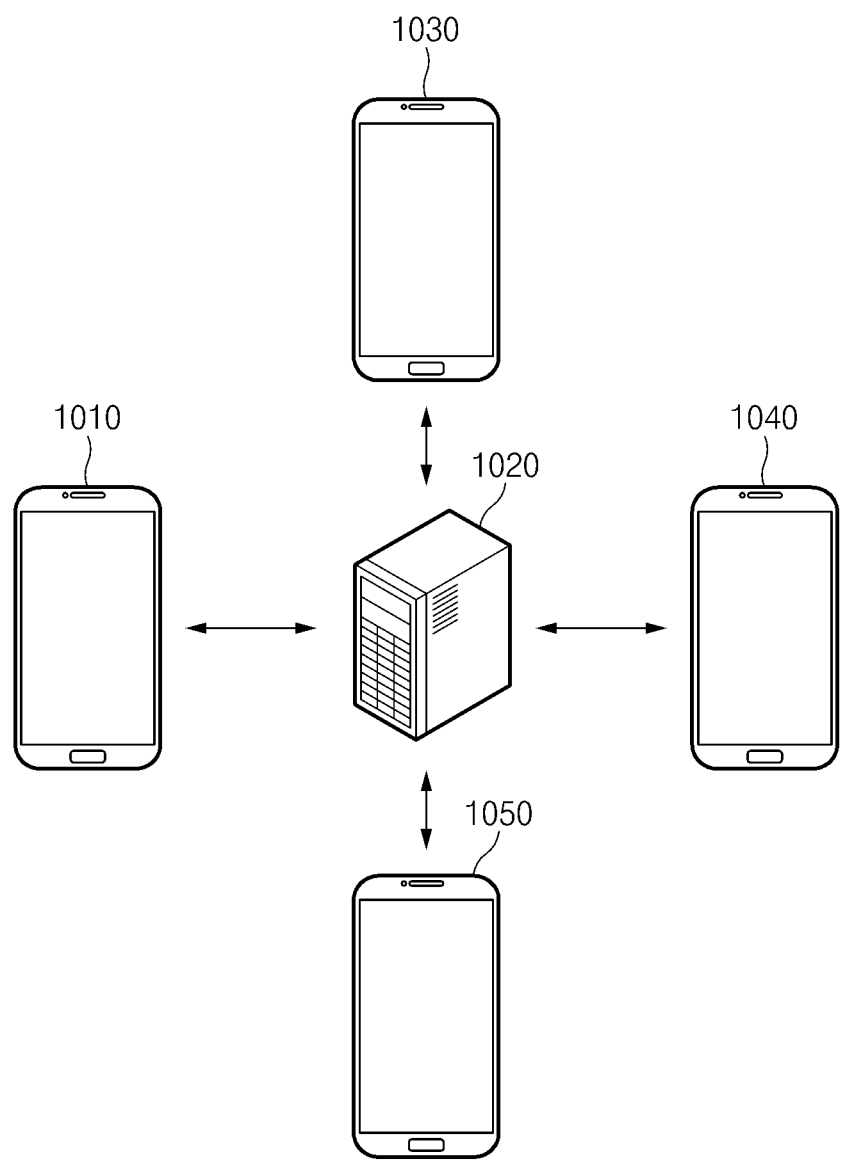
FIG. 10 is a diagram illustrating a system that performs call reservation when there is a plurality of external electronic devices, according to an embodiment of the present disclosure.

FIG. 10 is a diagram illustrating a system in which an electronic device performs call reservation in cooperation with a server when there is a plurality of external electronic devices including a first external electronic device, a second external electronic device, and a third external electronic device, according to an embodiment of the present disclosure. Although, in FIG. 10, an electronic device 1010, a server 1020, a first external electronic device 1030, a second external electronic device 1040, and a third external electronic device 1050 are connected with each other via a server 1020, these electronic devices may also be connected with each other through a network, such as the network 130 of FIG. 1 or the network 850 of FIG. 8.

In an embodiment of the present disclosure according to FIG. 8, the electronic device 810 requests call reservation from the first external electronic device 820, the second external electronic device 830, and the third external electronic device 840. By contrast, in the system illustrated in FIG. 10, the electronic device 1010 may designate the first external electronic device 1030, the second external electronic device 1040, and the third external electronic device 1050 as a call target and may transmit a call reservation request to the server 1020.

The server 1020 may be, for example, a server of a network operator, a server of an electronic device manufacturer, or a server of a third party, such as a server of a call reservation application provider.

The server 1020 may possess schedule information of the electronic device 1010, the first external electronic device 1030, the second external electronic device 1040, and the third external electronic device 1050. Accordingly, the server 1020 may perform an overall procedure for confirming a call reservation scheduled event based on a call reservation request received from the electronic device 1010. For example, when a call reservation type of the call reservation request is an automatic scheduling type, the server 1020 may compare the schedule information of the electronic device 1010, the first external electronic device 1030, the second external electronic device 1040, and the third external electronic device 1050 and may determine a scheduled event in light of an expected talk time.

The server 1020 may confirm a call reservation scheduled event based on the determined schedule and may notify each of the electronic device 1010, the first external electronic device 1030, the second external electronic device 1040, and the third external electronic device 1050 of the confirmed call reservation scheduled event.

Figure 11B:
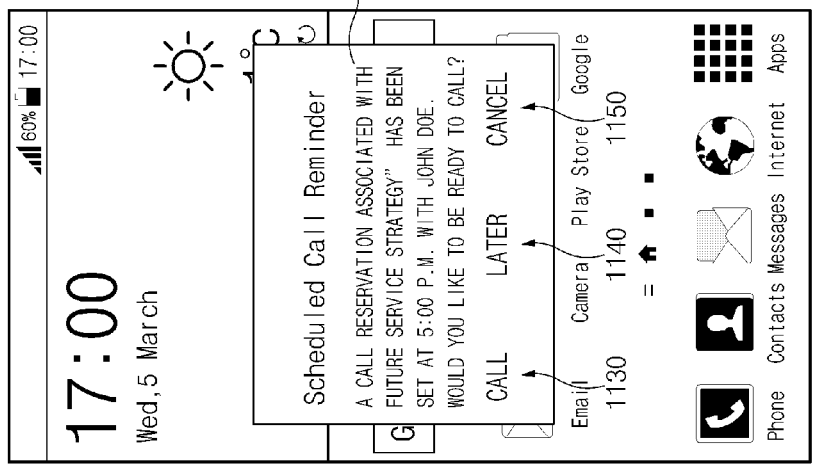
FIG. 11B is a diagram illustrating a feedback UI regarding a call reservation displayed on a screen of an external electronic device, according to an embodiment of the present disclosure.
Figure 11A:
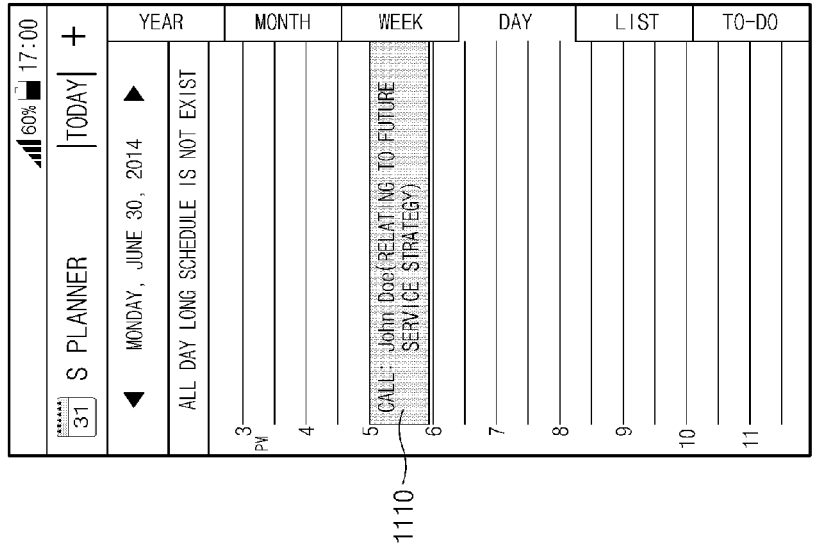
FIG. 11A is a diagram illustrating a feedback UI regarding a call reservation displayed on a screen of an external electronic device, according to an embodiment of the present disclosure.

FIGS. 11A and 11B are diagrams illustrating a feedback UI regarding a call reservation displayed on a screen of an external electronic device 120, according to an embodiment of the present disclosure.

FIG. 11A shows an execution screen of a schedule application 1100, and FIG. 11B shows a screen on which a call reservation notification UI 1120 is displayed.

Referring to FIG. 11A, the schedule application 1100 shows that a call reservation scheduled event 1110 is held during one hour from 5:00 pm to 6:00 pm on May 5, 2014.

Referring to FIG. 11B, a UI 1120, which outputs a notification of a call reservation scheduled event at 5:00 pm on May 5, is displayed on a screen of the electronic device 110. The UI 1120, which outputs the notification of the call reservation scheduled event, includes a call button 1130, a call later button 1140, and a cancel button 1150. The electronic device 110 may receive a user input selecting one of the buttons for calling immediately, calling back at a later time, and canceling the call, respectively, and may perform an operation corresponding to the selected result.

Figure 12A:
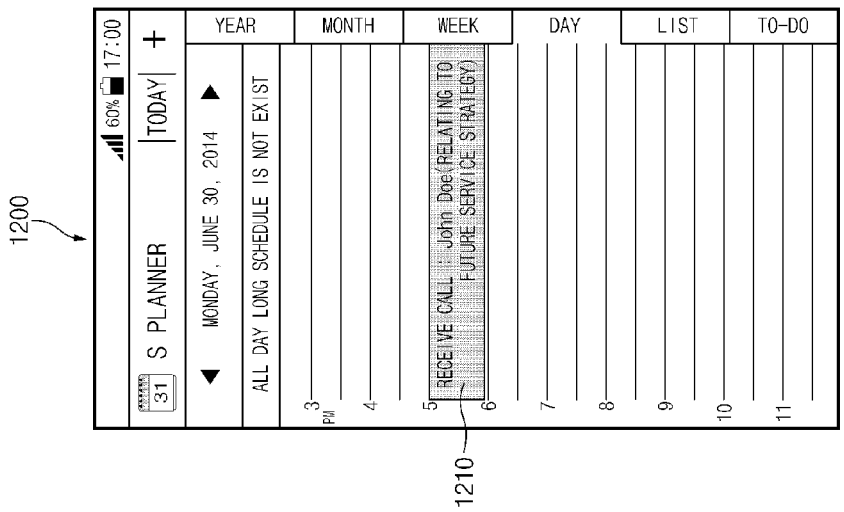
FIG. 12A is a diagram illustrating a UI that outputs a notification of a call reservation displayed on a screen of an external electronic device at a call reservation time, according to an embodiment of the present disclosure.
Figure 12B:
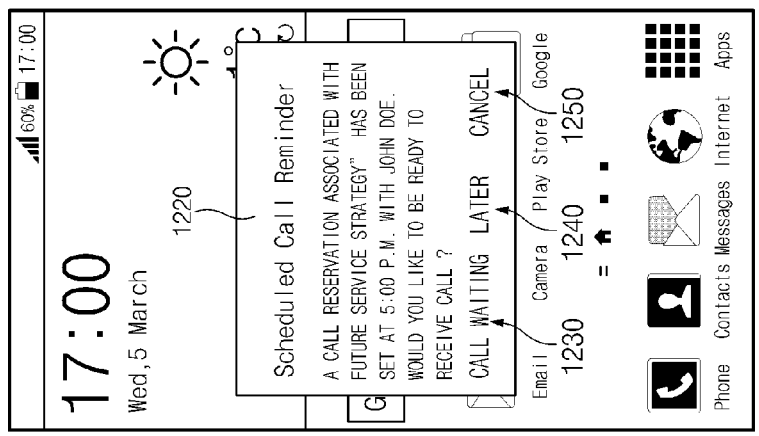
FIG. 12B is a diagram illustrating a UI that outputs a notification of a call reservation displayed on a screen of an external electronic device at a call reservation time, according to an embodiment of the present disclosure.
Figure 12C:
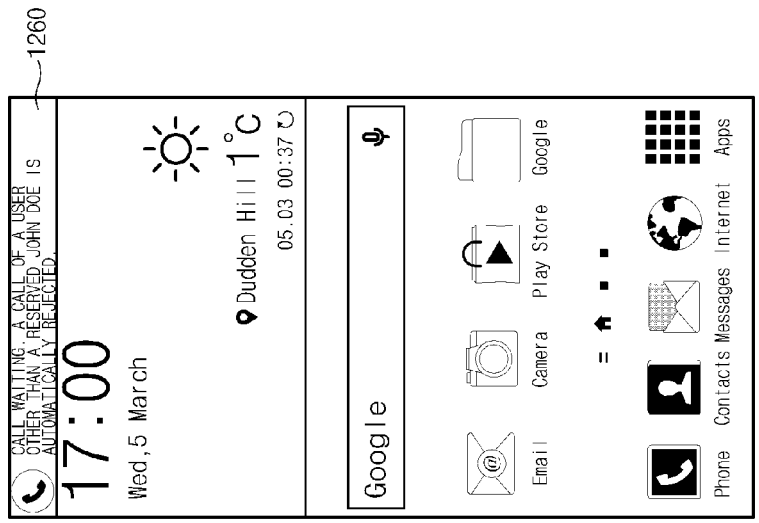
FIG. 12C is a diagram illustrating a UI that outputs a notification of a call reservation displayed on a screen of an external electronic device at a call reservation time, according to an embodiment of the present disclosure.

FIGS. 12A to 12C are diagrams illustrating a UI that outputs a notification of a call reservation displayed on a screen of an external electronic device at a call reservation time, according to an embodiment of the present disclosure.

FIG. 12A shows an execution screen of a schedule application 1200, FIG. 12B shows a call reservation notification UI 1220, and FIG. 12C shows a notification message 1260 about waiting for a call.

Referring to FIG. 12A, the schedule application 1200 shows that a call reservation scheduled event 1210 is held during one hour from 5:00 pm to 6:00 pm May 5, 2014.

Referring to FIG. 12B, a UI 1220 that outputs a notification of a call reservation scheduled event at 5:00 pm May 5 may be displayed on a screen of the electronic device 110. The UI 1220, which outputs the notification of the call reservation scheduled event, includes a call waiting button, a call back later button, and a cancel button. The external electronic device 120 may receive a user input selecting one of the buttons for call waiting, call back later, and cancel, respectively, and may perform an operation corresponding to the selected result.

An operation illustrated in FIG. 12C may be performed when a user input selecting a call waiting button is received through the UI 1220 outputting a notification of the call reservation scheduled event illustrated in FIG. 12B. The external electronic device 120 may be set such that a call coming from a person other than the caller designated for the call reservation scheduled event is automatically rejected, or as a response to user input. In addition, the external electronic device 120 may display the reason for rejecting the call according to the settings, in the form a notification message 1260 regarding the call waiting at the top of the screen of the external electronic device 120. The location of the notification message 1260 may not be limited to being located the top of the screen in accordance with embodiments of the present disclosure. For example, the notification message 1260 may be displayed only during a given time and may then disappear.

According to an embodiment of the present disclosure, an electronic device may include a communication circuit configured to communicate with at least one or more external electronic devices as a call reservation target, a processor electrically connected with the communication circuit, and a memory electrically connected with the processor. The processor may determine a type of a call reservation request from information inputted through a user input requesting a call reservation and may allow the communication circuit to transmit schedule information of the electronic device to the external electronic device or to request schedule information of the external electronic device, at least based on the type of the call reservation request.

According to an embodiment of the present disclosure, an operation in which the communication circuit transmits the schedule information of the electronic device to the external electronic device or requests schedule information of the external electronic device may also be performed based on a number of the external electronic devices.

According to an embodiment of the present disclosure, an operation in which the communication circuit transmits the schedule information of the electronic device may be performed when the type of the call reservation request is an automatic scheduling type and there is only one external electronic device.

According to an embodiment of the present disclosure, the processor may allow the communication circuit to receive an automatically scheduled call reservation scheduled event from the external electronic device.

According to an embodiment of the present disclosure, an operation in which the communication circuit requests the schedule information of the external electronic device may be performed when the type of the call reservation request is an automatic scheduling type and there is a plurality of external electronic devices.

According to an embodiment of the present disclosure, the processor may allow the communication circuit to receive the schedule information of the plurality of external electronic devices, may perform automatic scheduling using the schedule information of the plurality of external electronic devices and schedule information of the electronic device, and may allow the communication circuit to transmit the automatically scheduled call reservation scheduled event to the plurality of external electronic devices.

According to an embodiment of the present disclosure, when the type of the call reservation request is a manual scheduling type, the processor may not allow schedule information of the electronic device to transmit the external electronic device or to request schedule information of the external electronic device.

According to an embodiment of the present disclosure, the processor may allow the communication circuit to transmit a call reservation request about a call reservation scheduled event inputted through the user input to the external electronic device.

According to an embodiment of the present disclosure, the communication circuit may be further configured to communicate with a management server which stores a schedule of the electronic device and a schedule of the external electronic device, and the processor may allow the communication circuit to transmit the call reservation request to the management server when there is a plurality of external electronic devices.

According to an embodiment of the present disclosure, the processor may register, if a scheduled event corresponding to the call reservation request is confirmed, the confirmed schedule and may reject a call coming from an external electronic device, not corresponding to the registered schedule, at a time corresponding to the registered schedule.

According to an embodiment of the present disclosure, when the type of the call reservation request is a place scheduling type and there is only one external electronic device, the processor may allow the communication circuit to transmit place information, which a user designates, to the external electronic device.

According to an embodiment of the present disclosure, a method performed on an electronic device may include receiving a user input requesting a call reservation about at least one or more external electronic device, determining a type of a call reservation request from information inputted through the user input, and transmitting schedule information of the electronic device to the external electronic device or requesting schedule information of the external electronic device, at least based on the type of the call reservation request.

According to an embodiment of the present disclosure, the transmitting of the schedule information of the electronic device to the external electronic device or the requesting of the schedule information of the external electronic device may also be performed based on a number of the external electronic devices.

According to an embodiment of the present disclosure, the method may further include determining a scheduled event corresponding to a call reservation without transmitting the schedule information of the electronic device to the external electronic device in the case where the type of the call reservation request is a manual scheduling type.

According to an embodiment of the present disclosure, the method may further include determining a scheduled event corresponding to a call reservation without using the schedule information of the external electronic device in the case where the type of the call reservation request is a manual scheduling type.

The term "module", as used herein, may represent, for example, a unit including one or more combinations of hardware, software and firmware. The term "module" may be interchangeably used with the terms "unit", "logic", "logical block", "component" and "circuit". A module may be a minimum unit of an integrated component or may be a part thereof. A module may be a minimum unit for performing one or more functions or a part thereof. A module may be implemented mechanically or electronically. For example, the "module" may include at least one of an application-specific IC (ASIC) chip, a field-programmable gate array (FPGA), and a programmable-logic device for performing some operations, which are known or will be developed.

At least a portion of an apparatus (e.g., modules or functions thereof) or a method (e.g., operations) according to an embodiment of the present disclosure may be, for example, implemented by instructions stored in a computer-readable storage media in the form of a program module. The instruction, when executed by one or more processors (e.g., a processor 114), may cause the one or more processors to perform a function corresponding to the instruction. The computer-readable storage media, for example, may be the memory 116.

According to an embodiment of the present disclosure, a computer-readable recording medium recorded with an instruction may be provided. The instruction, which is executed by at least one processor, may cause the processor to perform a method that includes receiving a user input requesting a call reservation about at least one or more external electronic device, determining a type of a call reservation request from information inputted through the user input, and transmitting schedule information of the electronic device to the external electronic device or requesting schedule information of the external electronic device, at least based on the type of the call reservation request.

A computer-readable recording medium may include a hard disk, a magnetic media, a floppy disk, a magnetic media (e.g., a magnetic tape), an optical media (e.g., a compact disc read only memory (CD-ROM) and a digital versatile disc (DVD)), a magneto-optical media (e.g., a floptical disk), and hardware devices (e.g., a read only memory (ROM), a random access memory (RAM), or a flash memory). Also, a program instruction may include not only a mechanical code such as things generated by a compiler but also a high-level language code executable on a computer using an interpreter. The above hardware unit may be configured to operate via one or more software modules for performing an operation of the present disclosure, and vice versa.

A module or a program module according to an embodiment of the present disclosure may include at least one of the above elements, or a portion of the above elements may be omitted, or additional other elements may be further included. Operations performed by a module, a program module, or other elements according to an embodiment of the present disclosure may be executed sequentially, in parallel, repeatedly, or in a heuristic method. Also, a portion of operations may be executed in different sequences, omitted, or other operations may be added.

According to an embodiment of the present disclosure, an electronic device and a method thereof may perform call reservation, and thus a user may not set a separate alarm at a time when the user wants to make a call.

Furthermore, the electronic device and the method may select an automatic scheduling type and a manual scheduling type through a user input, thereby making is possible to broaden the width of the user's choice. In the case of selecting the automatic scheduling type, a call reservation time may be appropriately set using schedule information of the electronic device and schedule information of an external electronic device without needing to set a separate call reservation time, thereby improving user convenience.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a communication circuit configured to communicate with at least one external electronic device as a call reservation target;
a processor connected with the communication circuit; and
a memory connected with the processor,
wherein the processor is configured to:
determine a type of a call reservation request from information inputted through a user input requesting a call reservation,
control the communication circuit to perform at least one of transmitting schedule information of the electronic device to the at least one external electronic device and transmitting a request for schedule information of the at least one external electronic device, based on the determined type of the call reservation request,
register an event regarding the call reservation request in the schedule information, if the call reservation request is confirmed, and
reject a call coming from an external electronic device that does not correspond to the registered event, during a time corresponding to the registered event.

2. The electronic device of claim 1, wherein the communication circuit is configured to perform at least one of transmitting the schedule information of the electronic device to the at least one external electronic device and transmitting the request for schedule information of the at least one external electronic device further based on a number of one or more external electronic devices.

3. The electronic device of claim 1, wherein an operation the communication circuit is configured to transmit the schedule information of the electronic device when the type of the call reservation request is an automatic scheduling type and there is one external electronic device.

4. The electronic device of claim 3, wherein the processor is configured to control the communication circuit to receive an automatically scheduled call reservation scheduled event from the at least one external electronic device.

5. The electronic device of claim 2, wherein the communication circuit is configured to request the schedule information of the at least one external electronic device when the type of the call reservation request is an automatic scheduling type and there is a plurality of external electronic devices.

6. The electronic device of claim 5, wherein the processor is further configured to control the communication circuit to receive the schedule information of the plurality of external electronic devices, perform automatic scheduling using the schedule information of the plurality of external electronic devices and schedule information of the electronic device, and allow the communication circuit to transmit the automatically scheduled call reservation scheduled event to the plurality of external electronic devices.

7. The electronic device of claim 1, wherein when the type of the call reservation request is a manual scheduling type, the processor is further configured to prevent the electronic device from transmitting schedule information to the at least one external electronic device and from transmitting, to the external electronic device, a request for schedule information of the at least one external electronic device.

8. The electronic device of claim 7, wherein the processor is further configured to control the communication circuit to transmit a call reservation request regarding a call reservation scheduled event inputted through the user input to the at least one external electronic device.

9. The electronic device of claim 1, wherein the communication circuit is further configured to communicate with a management server that stores a schedule of the electronic device and a schedule of the at least one external electronic device, and
wherein the processor is further configured to control the communication circuit to transmit the call reservation request to the management server when there is a plurality of external electronic devices.

10. The electronic device of claim 1, wherein when the type of the call reservation request is a place scheduling type and there is one external electronic device, the processor is further configured to control the communication circuit to transmit place information, which a user designates, to the external electronic device.

11. A method performed on an electronic device, the method comprising:
receiving a user input requesting a call reservation with respect to at least one external electronic device;
determining a type of a call reservation request from information inputted through the user input;
transmitting to the at least one external electronic device, at least one of schedule information of the electronic device and a request for schedule information of the external electronic device, based on the type of the call reservation request;
registering an event regarding the call reservation request in the schedule information, if the call reservation request is confirmed, and
rejecting a call coming from an external electronic device that does not correspond to the registered event, during a time corresponding to the registered event.

12. The method of claim 11, wherein the transmission of at least one of the schedule information of the electronic device to the external electronic device and the request for the schedule information of the external electronic device is performed further based on a number of one or more external electronic devices.

13. The method of claim 11, further comprising:
determining a call reservation scheduled event without transmitting the schedule information of the electronic device to the external electronic device when the type of the call reservation request is a manual scheduling type.

14. The method of claim 11, further comprising:
determining a call reservation scheduled event without using the schedule information of the external electronic device when the type of the call reservation request is a manual scheduling type.

15. A non-transitory computer-readable recording medium having an instruction recorded thereon that is executed by at least one processor, causing the processor to perform a method comprising:
receiving a user input requesting a call reservation with respect to at least one external electronic device;
determining a type of a call reservation request from information inputted through the user input;
transmitting to the at least one external electronic device, at least one of schedule information of the electronic device and a request for schedule information of the external electronic device, based on the type of the call reservation request;
registering an event regarding the call reservation request in the schedule information, if the call reservation request is confirmed, and
rejecting a call coming from an external electronic device that does not correspond to the registered event, during a time corresponding to the registered event.

* * * * *